March 7, 1967 ATSUO MURATA ETAL 3,308,123
METHOD OF SEPARATING MELAMINE FROM WASTE GAS
Filed July 7, 1964
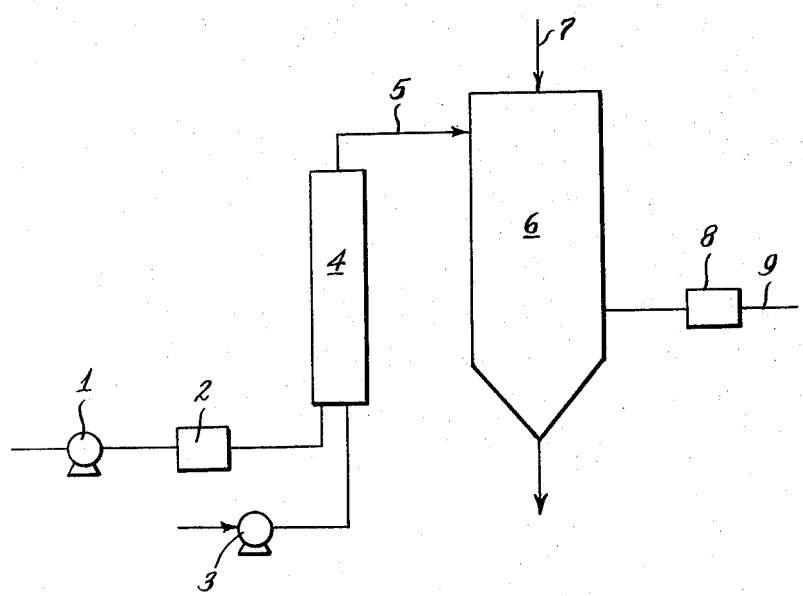
BY *Holcombe, Wetherill & Brisebois*
ATTORNEYS

3,308,123
METHOD OF SEPARATING MELAMINE FROM WASTE GAS
Atsuo Murata, Tokyo, Ryo Kokubo, Mizuhiko Nagakura, and Toshiro Ohba, Neigun, Toyama, and Mitsuo Arata, Urawa, Saitama, Japan, assignors to Nissan Kagaku Kogyo Kabushiki Kaisha, Tokyo, Japan
Filed July 7, 1964, Ser. No. 380,876
Claims priority, application Japan, July 18, 1963, 38/36,658
1 Claim. (Cl. 260—249.7)

This invention relates to an industrially useful process for separating melamine from waste gas, particularly from waste gas formed in the thermal cracking of urea in melamine production.

It is extremely important to separate continuously and on a large scale the molten substance mainly composed of melamine from $NH_3$ and $CO_2$ gases in the production of melamine by thermally cracking urea under pressure. However, melamine, which can remain stable in a molten state above its melting point of 354° C. under high pressure (particularly when the partial pressure of ammonia is more than 60 atm.) rapidly evolves ammonia if discharged under normal pressure and produces undesirable impurities such as melam and melem.

We have earlier proposed, in U.S. patent application No. 348,369, filed March 4, 1964 and now abandoned, a dry process of continuously separating melamine from $NH_3$ and $CO_2$ gases by introducing a reaction mixture of the molten substance mainly composed of melamine and $NH_3$ and $CO_2$ gases into a separator, where the cool ammonia gas is rapidly cooled by the circulated cool gas (i.e. the gas which is cooled after separation from melamine and then circulated); collecting the melamine powder at the bottom of said separator and simultaneously cooling and solidifying the powder, said melamine powder being continuously discharged out of the separator and the $NH_3$ and $CO_2$ gases being exhausted at the side of the separator.

This separation process is found to be the best method as the decomposition of melamine can be prevented and a high yield of high purity melamine can be obtained. However, a drawback is that an enormous quantity of cool ammonia gas, or cool circulating gas, is required for its industrial application on a large scale, because it uses gases with small heat capacity for the purpose of cooling the reaction mixture.

The consumption of a large amount of cool ammonia gas or circulating cool gas requires not only a large separator but also a large collector for melamine powder from the separator and a large separator and other accessories for separation of $NH_3$ and $CO_2$ from the discharged gas. Thus, the process has economical drawbacks.

A prior art wet process of separating melamine from waste gas has been proposed. In this process a melamine-separated aqueous solution is passed into a separator, where the molten substance mainly composed of melamine is uniformly blended, cooled and solidified, the temperature within the separator being maintained at over 60° C., thus yielding the solidified melamine in the form of slurry.

The above process is not very economical as an appreciable percentage of hydrolysis products such as ammeline, ammelide and cyanuric acid are formed when the molten melamine is rapidly cooled with water; moreover the purity and yield of melamine are low.

Ammonia decomposition of melamine takes place rapidly above the melting point of melamine but below the melting point it hardly occurs. By contrast, the hydrolysis of melamine is very fast even below the melting point, so that the loss in the wet separation process will be greater on account of hydrolysis than on account of ammonia decomposition.

We have found a process for economically separating melamine from $NH_3$ and $CO_2$ gases to give highly pure melamine in good yields. We have found that if molten melamine is rapidly cooled with water vapour or water vapour-containing gas, hydrolysis due to contact of water vapour with melamine will be negligible, unlike the case when liquid water is contacted with molten melamine. By utilising this effect we have invented an effective "semi-wet process" of melamine separation.

The present invention provides a process for the separation of melamine from waste gases, which comprises introducing a mixture of the molten substance, composed mainly of melamine, and gaseous ammonia and carbon dioxide into a separator, spraying the molten substance with water, the amount of water sprayed being so controlled that the average diameter of the water drops is less than $200\mu$ and the temperature in the separator is 90 to 200° C., simultaneously cooling and solidifying the molten substance and discharging the solidified melamine from the separator.

To further explain the effectiveness of the present invention, some experimental results on the dry separation process using cool ammonia gas, the wet process using water, and the cooling separation process using water vapour-containing ammonia gas are described below in order to compare the purity and yield of melamine obtained by different processes. Urea at a rate of 12 kg./hr. and ammonia at a rate of 5 kg./hr. were passed under a pressure of 120 kg./cm.² into an upright cylindrical reacting vessel, of 120 mm. inner diameter x 90 mm. high, at its bottom; then the vessel was heated so as to keep the temperature at 420° C. From the top of the vessel, a reaction product comprising molten melamine and $NH_3$ and $CO_2$ gases was removed and introduced into a separator, where the molten melamine was cooled and solidified by the cooling medium such as cool ammonia gas, water or water-vapour-containing ammonia gas depending on the process. Melamine was obtained from the bottom of the separator.

The compositions and yields of melamine obtained are given in the following table:

| Cooling Medium | Separator temperature, ° C. | Composition | | | Yield |
|---|---|---|---|---|---|
| | | Melamine | Hydrolytic products | Melam | |
| Cool ammonia gas | 120 | 96.9 | <0.2 | 1.2 | 97.3 |
| Do | 170 | 96.3 | <0.2 | 1.6 | 96.9 |
| Water | 70 | 98.7 | 6.4 | 2.1 | 90.6 |
| Mixture of 70% ammonia and 30% water vapour | 130 | 95.8 | <0.5 | 1.5 | 96.3 |
| Do | 180 | 95.9 | <0.5 | 1.5 | 96.3 |

The hydrolytic products are mainly ammeline and ammelide and include a small amount of cyanuric acid. What we called the "hydrolytic products" in the dry separation process using cool ammonia gas seems in reality not to occur within the separator but to have already been formed in the pressure reacting vessel.

As is seen from the results given above, the dry separation process using cool ammonia gas can produce melamine in the highest purity and yield; the wet separation process using water is not of great practical use as it gives hydrolytic products to an extent of several percent. The cool separation utilizing a water vapour-containing ammonia gas, which inevitably gives some hydrolytic products, is inferior to the dry cooling process using cool ammonia gas in both purity and yield of melamine obtained. However, the degree of inferiority in this last process is less than 0.5% at the most, which value is considered to be negligible, and this is easily tolerated for industrial application of the process, without any great disadvantage.

Of course, the cooling separation process (i.e. using a water vapour-containing ammonia gas) will have the drawback that such gas requires the same amount of cooling gas as does the cool ammonia gas.

However, we have made use of the advantage of the cooling separation process using water vapour or a water vapour-containing ammonia gas, namely that melamine suffers only slight hydrolysis, in the process of the invention.

The process can be carried out as follows: Water is sprayed into the separator in such manner that it can blend uniformly with the reaction product comprising molten melamine and $NH_3$ and $CO_2$ gases, the sprayed amount of water being so controlled that the temperature in the separator is kept higher than 90° C. and as the result the sprayed water may be turned entirely into vapour; thus the reaction mixture is rapidly cooled by the latent heat of evaporation, thereby solidifying the melamine content and economically separating it from waste gas.

The water sprayed into the separator comes into contact with $NH_3$ and $CO_2$ gases at least 350° C. and instantaneously evaporates, while the molten melamine is cooled by $NH_3$ and $CO_2$ gases which have been cooled to a low temperature. Thus, it is vital to keep the average diameter of the sprayed water drop at less than $200\mu$ maximum.

When the diameter of water drop is less than $200\mu$ evaporation will occur very speedily and in consequence there will be little chance of the molten melamine coming into actual contact with water; this means that practically all the molten melamine is cooled by the $NH_3$ and $CO_2$ gases, the greater part of which is constituted by water vapour, thus causing little hydrolysis of the melamine.

If the average diameter of the sprayed water drop becomes larger than $200\mu$, evaporation is retarded, giving much change for contact between molten melamine and water drop to occur accordingly promoting the hydrolysis of melamine.

The amount of sprayed water should be so controlled that the temperature within the separator is kept in the range of 90 to 200° C. Even if the temperature is below 90° C., all of the sprayed water must be evaporated so long as it is above the dew point. However, owing to the long time needed for evaporation, the chances of molten melamine (or even solidified melamine) coming into contact with water drops are increased at relatively high temperatures, and as the result melamine is liable to suffer hydrolysis. Moreover, the operation of the separator is often hampered by condensation of water on its side walls or at its base.

At temperatures above 200° C., the rapid-cooling effect is insufficient and in consequence the ammonia decomposition and hydrolysis of melamine are promoted. The amount of water sprayed into the separator depends on the total of the amount of ammonia and the urea in the pressure reacting vessel. The water consumption may, however, be calculated more easily than the thermal balance. For instance, when the amount of ammonia is half that of urea, the amount of water to be sprayed to keep the separator temperature at 150° C. will be equal to about 30% of the amount of urea.

With an increased addition of ammonia, the sprayed amount of water increases and vice versa. The discharged $NH_3$ and $CO_2$ gases from the separator with water vapour will amount to a fraction of the discharged gases from the separator in the dry separation process using cool ammonia gas or circulated cool gas; therefore the required separator and other accessories are very small, thus making the separation of melamine from waste gas very economical.

The following example illustrates the invention:

In the single figure of the accompanying drawing, 1 is an ammonia supply pump, 2 an ammonia heater, 3 a urea supply pump, 4 a pressure reaction vessel, 5 a spray tube for molten melamine, 6 a separator, 7 a water feed pipe, 8 a bag filter and 9 a gas discharge tube.

Molten urea is passed from the supply pump 3 at a pressure of 120 kg./cm.$^2$ and at a rate of 60 kg./hr., while ammonia is passed at a pressure of 120 kg./cm.$^2$ and at a rate of 30 kg./hr. from pump 1. These reactants are heated to 420° C. and then sent to the reacting vessel. The contents of the vessel are adequately heated so that the temperature in the vessel is 420° C. The vessel is so designed that it can retain the contents long enough for most of the urea to be converted to melamine. From the top of the vessel a reaction mixture of the molten substance consisting mainly of melamine and $NH_3$ and $CO_2$ gases is introduced into the separator 6. A spray tube sprays the mixture into the separator 6. The water is sprayed into the separator at a rate of about 17 litres/hr. in such manner that it can uniformly blend in eddy formation with the spray of the mixture, the average diameter of the water droplets being $50\mu$.

The temperature in the separator is held at 150° C. and the cooled solidified melamine powder is discharged at the bottom of the separator. The water vapour-containing $NH_3$ and $CO_2$ gases are exhausted at the side of the separator via discharge tube 9 so that small tiny particles of melamine are retained by the bag filter 8.

The quantity of crude melamine retained by the separator and bag filter is 22.0 kg./hr., its purity being 96.0% by weight and its yield 96.8% by weight. The amount of melam contained in the crude melamine is 1.7% and the hydrolytic products amount to less than 5% by weight.

What we claim is:

A process for the separation of melamine from waste gases, which comprises introducing a mixture of the molten substance, composed mainly of melamine, and gaseous ammonia and carbon dioxide into a separator, spraying the molten substance with water, the amount of water sprayed being so controlled that the average diameter of the water drops is less than $200\mu$ and the temperature in the separator is 90 to 200° C., simultaneously cooling and solidifying the molten substance and discharging the solidified melamine from the separator.

References Cited by the Examiner
UNITED STATES PATENTS

| | | | |
|---|---|---|---|
| 2,918,467 | 12/1959 | Hibbitts | 260—249.7 |
| 3,132,143 | 5/1964 | Fogagnolo | 260—249.7 |

WALTER A. MODANCE, *Primary Examiner.*

J. M. FORD, *Assistant Examiner.*